United States Patent [19]

Raehse et al.

[11] Patent Number: 5,431,780
[45] Date of Patent: Jul. 11, 1995

[54] PROCESS FOR SPRAY-DRYING MATERIALS AND MIXTURES THEREOF USING SUPERHEATED STEAM

[75] Inventors: Wilfried Raehse; Volker Bauer, both of Duesseldorf, Germany

[73] Assignee: Henkel Kommanditgesellschaft auf Aktien, Duesseldorf, Germany

[21] Appl. No.: 30,446

[22] PCT Filed: Sep. 20, 1991

[86] PCT No.: PCT/EP91/01798

§ 371 Date: Jul. 16, 1993

§ 102(e) Date: Jul. 16, 1993

[87] PCT Pub. No.: WO92/05849

PCT Pub. Date: Apr. 16, 1992

[30] Foreign Application Priority Data

Sep. 28, 1990 [DE] Germany ............ 40 306 88.7

[51] Int. Cl.$^6$ ............................................. B01D 1/18
[52] U.S. Cl. ............................ 159/48.1; 159/4.01; 159/4.09; 159/16.3; 159/DIG. 3; 159/DIG. 34; 252/89.1
[58] Field of Search ............ 159/48.1, 4.01, 4.04, 159/4.09, 16.3, DIG. 34, DIG. 3; 34/10, 57 R, 57 A; 252/89.1

[56] References Cited

U.S. PATENT DOCUMENTS

| | | | |
|---|---|---|---|
| 4,244,776 | 1/1981 | Nöltner et al. | 159/48.1 |
| 4,376,010 | 3/1983 | Gauvin | 159/48.1 |
| 4,549,978 | 10/1985 | Evans et al. | 159/4.04 |
| 4,552,681 | 11/1985 | Koch et al. | 159/48.1 |
| 4,600,472 | 7/1986 | Pitchon et al. | 159/48.1 |
| 4,813,155 | 3/1989 | Jensen et al. | 159/16.3 |
| 4,894,117 | 1/1990 | Bianchi et al. | 159/16.1 |
| 4,963,226 | 10/1990 | Chamberlain | 159/48.1 |
| 5,200,033 | 4/1993 | Weitzman | 159/16.3 |

FOREIGN PATENT DOCUMENTS 0058651  2/1982  European Pat. Off. .
0153704  2/1988  European Pat. Off. .

OTHER PUBLICATIONS

K. Masters, "Spray Drying"–An introduction to principles of operational practice and applications–Leonard Hill Books, London, An Intertext Publisher 1972.

Colin Beeby and Owen E. Potter, "Steam Drying", Depart. of Chemical Engineering, Monash University Clayton, 3168, Vic., Australia.

A. M. Trommelen and E. J. Crosby, "Evaporation and Drying of Drops in Superheated Vapors", University of Eisconsin, Madison, Wis., vol. 16, No. 5, pp. 857–867.

Werner Alexander Stein, "Calculation of Evaporation of Liquids from Moist Products in Spray Towers", Berechnung der Verdampfung von Flussigkeit aus feuchten Produkten im Spruhturm, vol. 7 (1973) Nr. 9, pp. 262–267.

Primary Examiner—Wilbur Bascomb, Jr.
Attorney, Agent, or Firm—Ernest G. Szoke; Wayne C. Jaeschke; Real J. Grandmaison

[57] ABSTRACT

The process of producing particulate, solid, pourable and free-flowing useful materials from water-containing preparations thereof by spray-drying in a hot gas stream under normal pressure wherein the hot gas stream is superheated steam, terminating the spray-drying of the materials before they are completely dry or damaged by heat effects, and then (a) mixing the spray-dried materials with an auxiliary component which is capable of binding residual quantities of water from the materials, or (b) further drying the spray-dried materials under conditions that will not damage the materials, or (c) post-treating the spray-dried materials in a manner as to homogenize the residual moisture in the materials.

21 Claims, No Drawings

PROCESS FOR SPRAY-DRYING MATERIALS AND MIXTURES THEREOF USING SUPERHEATED STEAM

BACKGROUND OF THE INVENTION

1. Field of the Invention

This invention relates to a process for the production of fine-particle, solid, pourable or free-flowing useful materials or mixtures of such useful materials, which are suitable as and/or for use in wetting agents, detergents and/or cleaning preparations, from aqueous preparations thereof. The process according to the invention uses the known principles of spray-drying, except that superheated steam is now used as the hot gas stream.

The spray-drying of aqueous preparations of useful materials of the type mentioned has been carried out worldwide on an industrial scale for decades. Hot air or mixtures of air and hot waste combustion gases are used as the drying gas stream. Washing powders or useful materials and/or mixtures thereof for the production of laundry detergents in pourable and free-flowing powder form are industrially obtained in corresponding spray-drying towers, generally at ambient pressure, either in co-current or more frequently in countercurrent. From the extensive specialist literature available, reference is made purely by way of example to Masters, K. "Spray Drying—An Introduction to Principles of Operational Practice and Applications", Leonard Hill Books, London, An Intertext Publisher, 1972.

The advantages and disadvantages of this drying process using hot air as the drying gas are well known and are discussed in detail in the specialist literature. In addition to the wide availability of the gas phase, the advantages include inter alia the possibility of operating in open systems (normally corresponding spray-drying towers) which provide for easy disposal of the hot gas phase by discharge into the atmosphere. In addition, detailed physico-chemical studies of the drying process itself have shown that drying with hot air takes place effectively and quickly, even where comparatively mild hot gas temperatures are used. The drying process on the water-containing droplet of material begins at comparatively low temperatures, for example of the order of 40° C., irrespective to a large extent of the temperature of the hot gas used, and continues effectively with a comparatively slow increase in the temperature of the droplet to the boiling range of water under normal pressure, so that the material to be dried is only subjected to a moderate heat effect. In overall terms, the drying process in hot air takes place quickly and effectively, even in its final phases, so that drying of the useful materials to the freeflowing product can be accompanied by a comparatively mild heat effect on the useful materials in the drying process.

However, the disadvantages and limitations of spray drying are also generally known, particularly in the field with which the present invention is concerned, namely the drying of useful materials or mixtures thereof, for example for laundry detergents and/or cleaning preparations. Reference is made purely by way of example to the following points: numerous useful materials in this field are sensitive to oxidation, particularly as organic components. The treatment with hot air can lead to substantial losses of value, particularly at relatively high temperatures. The drying of organic or substantially organic useful materials, for example corresponding surfactants based on natural materials, creates considerable problems arising out of the danger of fire or even explosion of the material being dried. Important components of the useful material, more particularly detergent-range nonionic surfactants, show a more or less pronounced tendency towards pluming and are discharged from the tower together with the steam-laden waste air. In overall terms, there is an increased danger of environmental pollution from the large throughput of water-containing, solid and gaseous materials or auxiliaries through the spray-drying tower. Attempts at recycling the drying gas stream have been largely unsuccessful in the industrial application of this process.

2. Discussion of Related Art

It has been known from the beginning of this century that superheated steam may be used instead of hot air for drying water-containing preparations of useful materials. Initial proposals along these lines go back to the year 1908. The possibilities of drying processes using super-heated steam as the hot gas medium have been closely investigated in the literature, particularly over the last few decades, and compared with the drying processes based on hot air typically encountered in practice. From the extensive literature available, reference is made to the following publications which, in turn, contain extensive literature indexes on this subject: A. M. Trommelen et al. "Evaporation and Drying of Drops in Superheated Vapors" AIChE Journal 16 (1970), 857–867; Colin Beeby et al. "STEAMDRYING", Soc. of Chem. Eng., Japan, Tokyo (1984), 51–68 and W. A. Stein "Berechnung der Verdampfung yon Flüssigkeit aus feuchten Produkten im Sprühturm (Calculating the Evaporation of Liquid from Moist Products in Spray-Drying Towers)", Verfahrenstechnik 7 (1973), 262–267. From the more recent patent literature, reference is made to EP-A1 058 651 and EP-A2 153 704.

The drying processes using superheated steam as the hot gas stream, which are now carried out in practice, use comparatively uncomplicated wet materials as the material to be dried. Thus, corresponding industrial processes have been developed for drying wet lignite, sand, for the production of dry animal feeds or for drying paper pulp. All these materials may be regarded as comparatively unproblematical under the operating conditions required for drying, particularly in regard to time and temperature. One of the above-cited publications reports on detailed studies to extend this operating principle to the drying of wet materials of varying origin. In "Evaporation and Drying of Drops in Superheated Vapors" loc. cit., A. M. Trommelen et al. describe detailed studies of isolated drops of various wet materials having a predetermined size on the one hand during their treatment with flowing hot air and on the other hand with flowing hot steam. Studies were made inter alia on the temperature dependence of the drying rate, the characteristic temperature profile in the particular drop investigated in dependence upon the hot gas stream used and its predetermined temperature and characteristic deviations of the dried material particles to be compared with one another. The materials to be dried include pure water, various water-containing preparations from the food sector, such as aqueous sucrose solution, tomato juice, coffee extract and milk, solutions and suspensions of inorganic materials in the form of a clay suspension and aqueous solutions of sodium sulfate and potassium nitrate and, finally, drops of an aqueous solution of a commercially available laundry detergent. Particulars of the composition of the laundry detergent used are not provided. More particularly, studies were made into the effects of the working temperature of the particular hot gas stream on the drying process and the drying rate, the temperature profile within the drop of material to be dried over the duration of the drying process and into the effect of the particular solids content on the temperature profile of the drop of material during the drying process and, finally, the physical characteristics of the dried particle of material. Investigations into the chemical characteristics of the dried material and/or its reuseability were not conducted, particularly in the case of the laundry detergent. More particularly, no study was made of the extent to which temperature-sensitive mixture components are damaged during the complete drying of the multicomponent mixture.

The following observations may be made in respect of all the samples of material investigated:

At temperatures of 150° C., the drying rate is distinctly higher for hot air than for the correspondingly super-heated steam. Only an increase in the operating temperature to 250° C. brings the respective drying rates closer together, although even then hot air generally still shows some advantages. This result is in accordance with other works on the same subject which shows that it is only at around 400° C. that the drying rates of the two hot gas media are entirely comparable with one another.

Another basic difference crucial to the understanding of the present invention is that, where the hot air stream is used, the drying process effectively begins at lower material temperatures. The elimination of water is so pronounced that, on reaching a material temperature of around 100° C., the drying process is substantially complete. For example, up to about 90% of the total water present in the drop has been removed by that time. The temperature profile of the drop is totally different where superheated steam is used. Under the effect of the condensation of the superheated steam on the cooler starting material and the release of the heat of condensation to the material to be dried, the water-containing drop is spontaneously heated to the boiling temperature of the water under operating conditions, i.e. to temperatures of around 100° C. where drying is carried out under normal pressure. This boiling temperature is maintained as the minimum temperature in the drop of material throughout the drying process. Depending on the degree of drying of the drop, the particular extent to which the aqueous phase is charged with the dry materials to be recovered leads to individual upward deviations in the temperature profile at an earlier or later stage.

Another known parameter of industrial drying processes is of considerable significance in conjunction with the problem addressed by the present invention, namely: in the spraying of solutions and/or slurries of useful materials from the field of wetting agents, detergents and/or cleaning products with which the invention is concerned, drops varying considerably in their individual particle sizes are formed and exposed to the drying process in the hot gas stream. This is reflected in the sieve analysis of the dry tower powder obtained, according to which most of the particles range, for example, from 0.05 to 0.5 mm in diameter. The actual particle size of the particular drop is a factor of considerable influence in respect of the individual drying state of the particular particle in question in the hot gas phase. The time required for complete drying of the particular drop increases excessively with increasing drop size so that, when individual drops of different particle size are compared with one another, the quotient of the particular time required to establish a predetermined degree of drying amounts to several times the corresponding ratio of the particle sizes to one another. For example, the relevant specialist literature mentions multiplication factors of the order of 20 to 100 for the particular limits in question.

Spray-drying processes are known to operate with a comparatively low solids density within the drying space, so that temperature equalization can only take place to a very limited extent in the partly or already extensively dried material through collision and contact of the individual particles with one another. Accordingly, the spray-drying zone differs clearly from heating in a fluidized bed, for example, in which the fine-particle material is used in a very much higher density, so that effective temperature equalization can take place between the individual particles.

Accordingly, the following conclusions may be drawn in regard to replacement of the hot gas stream based on air by superheated steam. The high evaporation rates necessary for operation on an industrial scale require comparatively high working temperatures where superheated steam is used. In the case of wet material, the temperature reaches the limit of 100° C. from the outset and can rapidly move upwards in the final phase of the drying process under the effect of the predetermined high temperature of the superheated steam. The fine particles of material are thus particularly at risk in the final phases of the drying step in which the coarse particles of material are still not sufficiently dry.

For temperature-sensitive materials of the type with which the invention is concerned, this understandably involves considerable dangers. Something else which has to be taken into consideration is the fact that—well-known in the field of drying with superheated steam—that the dry material discharged from the process contains water vapor which immediately condenses during the cooling phase and, hence, remains in the material as residual moisture. The overall outcome of the difficulties—discussed only briefly herein—of using superheated steam as a drying medium for starting materials of the type targeted by the invention would appear to be that this known principle has never been applied in practice to the mixtures of materials to be used in accordance with the invention.

The problem addressed by the present invention was to establish conditions under which, despite the difficulties described above, hot air could be replaced by superheated steam, for example in the production of powderform, storable, pourable and free-flowing laundry detergents or in the recovery of corresponding commercial forms of useful materials from this field, such as surfactants or surfactant-containing multicomponent mixtures.

DESCRIPTION OF THE INVENTION

Accordingly, the present invention relates to a process for the recovery of fine-particle, solid, pourable and free-flowing useful materials or mixtures of such useful materials, which are suitable as and/or for use in wetting agents, detergents and/or cleaning products, from water-containing preparations thereof by spray-drying in a hot gas stream under normal pressure. The process according to the invention is characterized in that superheated steam is used as the hot gas stream and drying of the particulate material is terminated before it is endangered by heat effects, the long-term pourability and free flow of the partly dried material if necessary being ensured by addition of mixture constituents which are capable of binding limited quantities of water. In addition to or instead of this auxiliary measure, the process according to the invention may also include an aftertreatment or after-drying stage for the material initially obtained which still contains excessive amounts of residual moisture either in its entirety or in at least part of the granular material. The aftertreatment and/or after-drying stage is carried out under such moderate conditions that there is no longer any danger of unwanted heat effects and the dangers they involve. Nevertheless, the after-drying stage may also be carried out in particular using superheated steam as the hot gas.

In other embodiments, the invention relates to the application of the process for the production of free-flowing surfactant solids, more particularly from the field of anionic surfactants based on natural materials, and to its application for the production of dried silicate-based useful materials which may be used, in particular, in laundry detergents and, finally, to the application of the described process for the production of so-called laundry detergent tower powders to which temperature-sensitive and/or steam-volatile components may be added to build up or complete the final laundry detergent.

DETAILED DESCRIPTION OF THE INVENTION

The process according to the invention is based on the realization that, providing certain limitations are accepted in regard to the drying result in the end product, use can be made of the many advantages of replacing hot air by superheated steam in spray-drying, even in the case of the sensitive and occasionally complex mixtures targeted by the present invention. According to the invention, a key element in this regard is to tolerate residual moisture contents in the dry material which can be quite considerable, depending on the particular individual case, but at the same time to ensure the long-term pourability and free flow of the granular material thus dried either by the optional incorporation of auxiliaries and/or by the inclusion of an aftertreatment and-/or after-drying stage. As will be described in more detail hereinafter, the auxiliaries may in turn be selected useful materials for the proposed application or inert materials. According to the invention, therefore, it is possible to maintain the quality standards of the complex requirements governing the multicomponent mixtures based on organic and inorganic components, for example laundry detergents, targeted by the invention without any reductions in quality and with all the advantages of drying with superheated steam. Unwanted components do not have to be discharged into the atmosphere, oxidation processes involving particularly susceptible components of the wetting agents, detergents and cleaning preparations are suppressed, risks of fire and explosions are eliminated, the steam used for drying is circulated and only the vapor coming from the material to be dried has to be purified. Entrained fractions of material accumulating in the process and any liquid components which may be formed by partial condensation may be returned to the drying process and other well-known technological advantages may be utilized for designing the corresponding equipment.

A key factor for understanding the teaching according to the invention is that there is no longer any need to obtain optimal drying results by the effect of superheated steam in the end product of the process. Residual moisture contents, even of quite considerable proportions, can be tolerated providing it is ensured through the composition of the material that the residual water is bound by "internal drying" to such an extent that the long-term pourability and free flow of the dry material is guaranteed.

In addition to or instead of this auxiliary measure, it is possible in accordance with the invention to subject the partly dried material initially obtained to an after-treatment. This aftertreatment is determined by two technical concepts which may even be combined with one another.

The first of these concepts is based on the fact mentioned at the beginning that the degree of drying of the particular droplet in question is determined by its particle size. If, in the context of the invention, the spray-drying process is terminated at a time at which considerable quantities of residual moisture are still present in the material, integral consideration of the residual moisture content is in fact only partly justified. In the differential consideration of the distribution of this residual moisture among the individual fractions of material, it was found that the fine and very fine particles can be very largely or completely dried while the coarser particles still contain such considerable quantities of moisture that the long-term pourability and free flow of the material removed from the spray-drying zone is still not guaranteed. In one important embodiment of the process according to the invention, therefore, "after-drying" of the primary material from the spray-drying zone is achieved by an additional treatment step which, without subjecting the powder-form material to any danger in the form of agglomeration, leads to homogenization of the moisture content throughout the material, irrespective of the individual particle sizes. In this way, residual moisture can be transferred from the still comparatively moist, relatively coarse particles of material to the fine and very fine materials in such a quantity that, after this homogenization step, the long-term pourability and free flow of the dry material is guaranteed without any need for further quantities of moisture to be discharged from the bulk material.

The aftertreatment step may be carried out by any techniques capable of establishing moisture equilibrium between the individual particles while, at the same time, preventing the material from agglomerating. For example, the material initially obtained may be circulated or shaken in a continuous or discontinuous process. It can be of particular advantage to aftertreat the material in a fluidized bed which, compared with spray drying, has a very much higher solids density. Any gases, including for example ambient air, may be used for this purpose. Oxidative damage to the material and/or unwanted pollution of the waste air no longer occurs or is easy to control. Since the material to be dried is removed from the spray-drying zone at elevated temperture, typically of the order of 100° C., a slight additional reduction in the residual moisture content can be obtained by this subsequent homogenization of moisture in a fluidized bed operated, for example, with ambient air.

In addition to or instead of this auxiliary measure, however, an additional drying step may also be included in the process according to the invention for further reducing the residual moisture content. If this additional drying should prove desirable, one such additional after-drying step will generally be sufficient. However, it is also possible in accordance with the invention to carry out the after-drying phase in a sequence of several steps. The after-drying step(s) is/are characterized in that they are carried out under conditions which largely rule out any significant danger to the useful constituents of the material being dried. In principle, several process parameters are available for reducing the risks, including for example reducing the temperature of the hot gas phase, using drying gases of different origin, for example air and/or inert gas, instead of superheated steam as the hot gas and changing to another drying technology.

In one preferred embodiment of the process according to the invention, the solids density of the material to be dried in the hot gas stream is substantially increased by the inclusion of an after-drying step of the type in question, so that the process principles of spray-drying in the fluidized bed from the first stage of the process are carried over into the after-drying step. The fluidized-bed after-drying step may in turn be carried out with any drying gases. In the preferred embodiment of the invention, superheated steam is also used as the hot gas in the after-drying step. However, through the intensive heat exchange between the now comparatively closely packed solid particles, unwanted overheating of the material to be dried and, more particularly, the danger of overheating of the fine-particle component of the material can thus be effectively counteracted. In preferred embodiments of the invention, the elements of the above-mentioned "internal drying" may be used in this case, too, to bind any residual moisture still present through the composition of the material to be dried.

Water-containing preparations of useful materials or combinations thereof from the field of wetting agents, detergents and/or cleaning products, which are not damaged significantly, if at all, by brief exposure to water or steam at temperatures in the range from 100° to 110° C., are particularly suitable for use in the process according to the invention. Components of this type which safely withstand temperatures in the above-mentioned range for about 0.5 to 1 minute under the working conditions are particularly suitable as constituents of the useful materials. The following auxiliary considerations are essential to the comparatively broad scope of application of the process according to the invention. Although the temperature of the water-containing starting material to be dried increases almost immediately to the boiling temperature of water (i.e. to approximately 100° C. under normal pressure) where superheated steam is used, this temperature is subsequently maintained for a very considerable period of time in the course of the drying process. The same law is also valid in complex mixtures which form a skin during the drying process, as is the case for example with surfactant-containing mixtures. The same also applies to comparatively low and high or even very high temperatures of the superheated steam. Operating temperatures in the range from about 100° to 110° C. in aqueous medium are no longer suitable on account of the danger of unwanted reactions being initiated in numerous useful materials of the type targeted by the invention. However, the key factor is that the duration of this heat effect can be kept so short in the process according to the invention that, under the operating conditions selected, no significant damage need occur in the material to be dried. For example, even surfactant compounds which are basically susceptible to hydrolysis are capable of safely withstanding holding times of a few minutes under these operating conditions providing certain boundary conditions well known to the expert are maintained. Thus, water-containing preparations of water-soluble and/or insoluble, organic and/or inorganic useful materials from wetting agents, detergents and/or cleaning products which may be assigned, for example, to the following classes may be dried by the drying process according to the invention: components having a surfactant or emulsifier effect, inorganic and/or organic builders or builder components, washing alkalis, fillers and neutral salts, fabric softeners, bleach activators, auxiliaries for improving the soil suspending power of the wash liquors, such as redeposition inhibitors, or even abrasives.

If the temperature sensitivity of the useful material or mixture of useful materials to be dried means that considerable quantities of water have to be retained in the product of the main drying phase, so that this residual water has to be bound to guarantee the long-termpourability or free flow of the dry material, auxiliaries capable of fixing water are used in accordance with the invention, preferably in the form of particulate solids. In this case, residual water may be fixed, for example, by binding as water of crystallization. However, limited quantities of water may also be bound purely by absorption in solid particles of the type in question here without giving rise to any unwanted tackiness or adhesion of the particles to one another. The auxiliaries are used at least in quantities sufficient to guarantee pourability and stability in storage, despite the residual moisture remaining in the material.

In one embodiment of the invention, the auxiliaries binding the residual water may be added to and intensively mixed with the dried fresh material immediately after its removal from the process. In preferred embodiments, however, the auxiliaries binding residual water are added to the water-containing preparations of useful materials at least partly, preferably at least predominantly and, in general, in their entirety before the preparations are spray-dried. This particular embodiment may always be applied if the particular temperture sensitivity of the material to be dried accommodates drying to such an extent that the residual moisture remaining can be adequately absorbed and fixed by the auxiliaries used.

A preferred embodiment of the process according to the invention in this regard is characterized in that useful materials from wetting agents, detergents and/or cleaning products which, for their part, show adequate temperature stability are used as the auxiliaries for binding residual water. Typical examples of such useful materials are inorganic useful materials binding water of crystallization from the groups of builder components, washing alkalis and/or so-called fillers. Typical examples of the subclasses of useful materials in question here are silicate compounds which bind water of crystallization, particularly from the class of zeolites. Today, an example particularly characteristic of laundry detergents is detergent-quality zeolite NaA which has a calcium binding power of 100 to 200 mg CaO/g, cf. DE 24 12 837. Typical examples of washing alkalis which bind water of crystallization are soda or sodium bicarbonate while sodium sulfate—as a neutral salt or filler—has a considerable capacity for binding considerable quantities of water of crystallization. However, in addition to or instead of these auxiliaries capable of binding water of crystallization, the residual water may also be removed by auxiliaries or corresponding useful materials which are capable of binding water by absorption. Thus, it is known that typical redeposition inhibitors based on starch or cellulose, fabric softeners, particularly those based on inorganic swellable silicates, and a number of organic surfactant compounds which are solid under normal conditions are capable of absorbing considerable quantities of water without developing unwanted surface tackiness in the process.

Depending on the temperature sensitivity of the useful materials used or mixtures thereof on the one hand and the type and quantity of the auxiliaries optionally used on the other hand, considerable quantities of residual water may remain behind in the dried fine-particle material without jeopardizing its long-term pourability and free flow. According to the invention, therefore, drying with super-heated steam is terminated at residual water contents of the material removed from the spray-drying zone of from about 1 to 20% by weight and preferably in the range from about 5 to 15% by weight. These percentages by weight are based on the weight of the fine-particle material removed from the steam zone. According to the invention, however, it is also preferred to limit that component of the residual water which is not bound as water of crystallization. Thus, it may be useful to limit this water component to at most about 10% by weight, preferably to no more than about 5 to 7% by weight and, better still, to values of at most about 3 to 4% by weight. These percentages by weight are again based on the weight of the material removed from the steam zone. Taking specialist knowledge from the field in question into consideration, it is thus reliably possible, even using superheated steam at high operating temperatures, to combine the desired properties: adequate drying at moderate temperatures, termination of the drying reaction, even if considerable quantities of residual water are still present in the material, in order thus to rule out unwanted heat effects, and at the same time to ensure the long-term pourability and free flow required in practice.

As already mentioned, the process according to the invention includes additional possibilities for establishing the particular residual moisture content required which may be used either instead of or in addition to the above-mentioned principle of internal drying. These alternative possibilities comprise homogenization and/or stepwise reduction of the moisture content in the material to be dried, the spray-drying stage being followed by one or more after-drying stages which, under comparatively moderate working conditions, still release moisture in troublesome quantities. Basically, any after-drying processes known to the expert which involve direct or indirect contact with hot gases are suitable for this purpose. The preferred alternative of the process according to the invention also includes an additional step using superheated steam for the after-drying stage. To reduce the risk of damage to the temperature-sensitive material, the superheated steam may be used at a lower temperature than in the spray-drying stage. However, the following alternative has proved to be particularly effective:

The fine-particle material still containing too much residual moisture is removed from the spray-drying zone and transferred to a following fluidized-bed drying stage. Partial agglomeration of the still sufficiently moist material from the spray-drying zone to form a relatively coarse agglomerate may readily be accepted or may even fall within the scope of a preferred embodiment of the teaching according to the invention. More particularly, a partial agglomeration step of the type in question may be used to bind the fine component of the material removed from the spray-drying zone and to combine it, for example, with the still relatively moist coarse particles of the primary drying product. The following fluidized-bed drying stage is operated in known manner with the greatly increased solids densities in the drying zone which lead to the intensive exchange of heat between all the solid particles of the fluidized bed and thus prevent unwanted increases in temperature in part of the granular material to be dried, even when steam which has been heated to comparatively high temperatures is used as the drying gas.

In the fluidized-bed drying stage, it is generally only necessary to remove limited quantities of the residual moisture to ensure the long-term flowability of the granular material, so that the holding time of the material in the fluidized-bed aftertreatment stage can also be kept short, amounting for example to only a few minutes. The main drying process in the spray-drying zone and the after-drying phase in the fluidized bed may be carried out either as a continuous process or independently of one another as separate process steps. General specialist knowledge may be applied in this regard.

In the after-drying stage, the residual moisture still present may be partly or substantially completely removed. In practical embodiments, at least about 10 to 70% and preferably about 20 to 50% of the residual moisture in the material removed from the spray-drying zone (% based on residual moisture) is removed in this particular modification of the process. Moisture ultimately remaining in the material is made harmless by the internal drying.

In one important embodiment, the process according to the invention is used to dry mixtures of useful materials for the production of laundry detergents. In this case, the water-containing starting materials to be dried preferably contain washing-active surfactants together with builders and, if desired, washing alkalis and/or neutral salts. The particular multicomponent mixtures used are at least partly capable of binding and/or fixing residual water, more particularly in the form of water of crystallization. As in the spray-drying of laundry detergents, the mixtures in question for the production of laundry detergents are generally not subjected to spray-drying as a whole. This is prevented by the extreme temperature sensitivity of peroxide-containing bleaching components, such as perborate monohydrate or tetrahydrate, and corresponding other particularly temperature-sensitive components, such as for example enzymes, fragrances, optionally bleach activators and other minor components. Accordingly, the teaching according to the present invention also encompasses inter alia the production of so-called multicomponent tower powders which contain a large part of the components making up the final detergent in admixture with one another, but which are subsequently mixed with other liquid and/or solid active-substance components. Known examples of such liquid components are, in particular, readily volatile nonionic surfactant components which, although no longer discharged into the atmosphere through the waste gas in the process according to the invention, can nevertheless readily be added to the detergent as a whole by subsequent spraying onto a prepared, absorbent tower powder prepared in accordance with the invention.

The operating conditions of the process according to the invention enable high tempertures of the circulated steam phase to be applied in the drying step of the spray-drying process. The operating temperatures are generally above 150° C. and are preferably at least about 200° C. in the gas phase. Operating temperatures of 250° C. and higher can be of particular advantage and temperatures of at least 300° C. and, more particularly, in the range from 300° to 380° C. may even be considered. In many cases, operating temperatures in the range from about 270° to 350° C. in the steam phase are particularly suitable (all the temperatures mentioned are based on the temperature of the steam heated to the optimal temperature which is delivered to the spray-drying zone in co-current or countercurrent). The temperature of the steam falls in known manner during its contact with the wet or moist material. The quantitative ratios between the quantity of liquid to be evaporated and the amount of superheated steam introduced are largely determined by energy-related considerations, more particularly in regard to the intended subsequent use of the steam to be removed from the circuit. Possible embodiments in this regard are characterized in that the temperature of the steam after leaving the spray-drying zone is reduced to only a limited extent, for example to around 190° to 250° C., while in other embodiments it can be useful or advantageous to continue utilizing the thermal energy of the steam until the temperature of the steam falls into the vicinity of the condensation temperature under process conditions. More specifically, these questions of detail are determined by the design of the recycle process as a whole. Corresponding considerations apply to the use of superheated steam as heating gas in an optional fluidized-bed after-drying stage. The figures cited above apply in this case too.

Basically, it may be said in respect of these considerations that the process is carried out in a closed-loop system using recycled steam from which the evaporated water of the starting material is removed while the energy released above all during the drying step is returned to the recycle stream. In one important embodiment, the steam removed is first freed from entrained particles of material and then used as process steam for another application, if desired after the temperature and pressure of the steam have been adapted to the conditions required for that application. In another embodiment of the process according to the invention, it may be useful to condense at least part of the steam removed, for example for wet washing of the steam removed and the elimination of entrained particles of material. The aqueous liquid phase accumulating may be returned to the drying process together with the useful materials removed from the circuit which are present in this liquid phase. In this connection, it is possible for example to use vaporus components of the gas stream removed to concentrate this washing liquid phase. The quantities of liquid returned with contents of useful materials may be directly delivered to the spray-drying zone or may first be mixed with the fresh water-containing preparations and introduced in that form into the spray-drying zone for drying.

General particulars of useful materials for direct or indirect use in the production of wetting agents, detergents and/or cleaning products using the working principles according to the invention are given in the following with reference to typical components of laundry detergents.

Suitable anionic surfactants are, for example, soaps of natural or synthetic, preferably saturated fatty acids. Soap mixtures derived from natural fatty acids, for example coconut oil, palm kernel oil or tallow fatty acids, are particularly suitable. Soap mixtures of which 50 to 100% consist of saturated $C_{12-18}$ fatty acid soaps and 0 to 50% of oleic acid soap are preferred.

Other suitable synthetic anionic surfactants are those of the sulfonate and sulfate type. The process according to the invention can be of particular significance for corresponding compounds of vegetable and/or animal origin.

Suitable surfactants of the sulfonate type are alkylbenzene sulfonates ($C_{9-15}$ alkyl), olefin sulfonates, i.e. mixtures of alkene and hydroxyalkane sulfonates and also sulfonates of the type obtained, for example, from monoolefins containing a terminal or internal double bond by sulfonation with gaseous sulfur trioxide and subsequent alkaline or acidic hydrolysis of the sulfonation products. Other suitable surfactants of the sulfonate type are alkane sulfonates obtainable from $C_{12-18}$ alkanes by sulfochlorination or sulfoxidation and subsequent hydrolysis or neutralization or by the addition of bisulfites onto olefins and, more particularly, the esters of α-sulfofatty acids (ester sulfonates), for example the α-sulfonated methyl esters of hydrogenated coconut oil, palm kernel oil or tallow fatty acids.

Other important surfactant or emulsifier components in this regard are the so-called disalts which may be obtained by saponification of the above-mentioned α-sulfonated fatty acid methyl esters or by direct sulfonation of, in particular, saturated fatty acids, more particularly $C_{12-18}$ fatty acids. Accordingly, the process according to the invention makes it possible for the first time on an industrial scale readily to produce surfactants based on natural materials of the type described both here and in the following in a dry, free-flowing concentrate form which shows virtually indefinite stability in storage and can thus make a significant contribution to the worldwide replacement of ABS.

Suitable surfactants of the sulfate type are the sulfuric acid monoesters of primary alcohols of natural and synthetic origin, i.e. of fatty alcohols, for example coconut oil fatty alcohols, tallow fatty alcohols, oleyl alcohol, lauryl, myristyl, palmityl or stearyl alcohol, or the $C_{10-20}$ oxoalcohols and those of secondary alcohols of the same chain length. The sulfuric acid monoesters of alcohols of natural and/or synthetic origin ethoxylated with, in particular, 1 to 6 mol ethylene oxide are also suitable components. Such compounds as 2-methyl-branched $C_{9-11}$ alcohols containing on average 3.5 mol ethylene oxide are mentioned as examples of synthetic alcohols. Sulfated fatty acid monoglycerides are also suitable.

The anionic surfactants may be present in the form of their sodium, potassium and ammonium salts and also as soluble salts of organic bases.

Suitable nonionic surfactants are adducts of 1 to 40 mol and preferably 2 to 20 mol ethylene oxide with 1 mol of an aliphatic compound essentially containing 10 to 20 carbon atoms from the group consisting of alcohols, carboxylic acids, fatty amines, carboxylic acid amides or alkane sulfonamides. The adducts of 8 to 20 mol ethylene oxide with primary alcohols, such as for example coconut oil or tallow fatty alcohols, oleyl alcohol, oxoalcohols or with secondary alcohols containing 8 to 18 and preferably 12 to 18 carbon atoms are particularly important. In addition to the water-soluble nonionics, however, water-insoluble or substantially water-insoluble polyglycol ethers containing 2 to 7 ethylene glycol ether units in the molecule are also of interest, particularly if they are used together with water-soluble, nonionic or anionic surfactants. It has already been pointed out that the tendency of nonionic surfactants of the type in question to be carried over can also be taken into account in the process according to the invention by completely or partly applying components of this type to a correspondingly preformed tower powder on completion of the spray-drying process. More particularly, the same can also apply to nonionic surfactants liquid at room temperature.

Other suitable nonionic surfactants are alkyl glycosides corresponding to the general formula R—O—(G)$_x$, in which R is a primary, linear or branched aliphatic radical containing 8 to 22 and preferably 12 to 18 carbon atoms, G is a symbol standing for a glycose unit containing 5 or 6 carbon atoms and the degree of oligomerization x is between 1 and 10.

Suitable organic and inorganic builders are soluble and/or insoluble components showing a mildly acidic, neutral or alkaline reaction which are capable of precipitating or complexing calcium ions. Suitable and, above all, ecologically safe builders are finely crystalline, synthetic zeolites of the type already mentioned. Other builders which may be used in particular together with the zeolites include (co)polymeric polycarboxylates, such as polyacrylates, polymethacrylates and, in particular, copolymers of acrylic acid with maleic acid, preferably those containing 50% to 10% maleic acid. The molecular weight of the homopolymers is generally between 1,000 and 100,000 while the molecular weight of the copolymers is between 2,000 and 200,000 and preferably between 50,000 and 120,000, based on free acid. A particularly preferred acrylic acid/maleic acid copolymer has a molecular weight in the range from 50,000 to 100,000. Suitable, although less preferred compounds of this class are copolymers of acrylic acid or methacrylic acid with vinyl ethers, such as vinylmethyl ether, in which the acid makes up at least 50%. Also suitable are polyacetal carboxylic acids of the type described, for example, in U.S. Pat. Nos. 4,144,226 and 4,146,495 and also polymeric acids obtained by polymerization of acrolein and subsequent disproportionation with alkalis and consisting of acrylic acid units and vinyl alcohol units or acrolein units.

Suitable organic builders are, for example, polycarboxylic acids preferably used in the form of their sodium salts, such as citric acid and nitrilotriacetate (NTA), providing there is nothing ecologically objectionable in their use.

In cases where a phosphate content can be tolerated, it is also possible to use phosphates, more particularly pentasodium triphosphate, and optionally pyrophosphates and orthophosphates which act primarily as precipitants for lime salts.

Suitable inorganic non-complexing salts are the bicarbonates, carbonates, borates or silicates of the alkali metals which are also known as "washing alkalis". Of the alkali metal silicates, sodium silicates with a ratio of Na$_2$O to SiO$_2$ of 1:1 to 1:3.5 are particularly suitable. Of the remaining groups of typical detergent constituents, components from the classes of redeposition inhibitors (soil suspending agents), neutral salts and fabric softeners may be considered for use in the spray drying process according to the invention.

Suitable redeposition inhibitors are, for example, carboxymethyl cellulose, methyl cellulose, methyl hydroxy-ethyl cellulose and mixtures thereof. A typical example of a suitable representative of the neutral salts is sodium sulfate which has already been mentioned. Suitable softeners are, for example, swellable layer silicates selected from corresponding montmorillonites, for example bentonite.

As already mentioned, typical constituents of detergents and cleaning products which are sensitive to high temperatures, such as bleaches based on per compounds, enzymes from the class of proteases, lipases and amylases or bacterial strains or fungi, stabilizers, perfumes, temperature-sensitive dyes and the like, are best mixed with the dry powders obtained beforehand.

EXAMPLES

Example 1

A sodium zeolite 4A powder was produced by spray-drying of an aqueous slurry of the product with super-heated steam in a pilot-plant spray-drying tower of the "Minor Production" type manufactured by the Niro-Atomizer Company. The slurry pumped into the tower (2.0 kg/h) had a water content of 54.0% and a temperature of 50° C. The slurry was atomized at a rotational speed of the atomizer of 25,000 r.p.m. The superheated steam was introduced in co-current (140 kg/h) at a temperature of 300° C. and left the spray drying tower with a temperature of 120° C. The following product was obtained—the results obtained by drying with air (air entry temperature 220° C., air exit temperature 80° C.) are shown in brackets for comparison:

| Sieve analysis in % | |
|---|---|
| larger than 1.6 mm | 0.2 (0.2) |
| larger than 0.8 mm | 0.6 (3.4) |
| larger than 0.4 mm | 23.2 (35.3) |
| larger than 0.2 mm | 36.8 (43.4) |
| larger than 0.1 mm | 38.3 (16.0) |
| larger than 0.01 mm | 0.9 (1.7) |

The product had an apparent density of 560 g/l (518 g/l) and a water content of 15% (11.7%), as determined in the usual way with a Sartorius type 1405 infra-red dryer.

Example 2

This test was carried out as in Example 1 in a Niro-Atomizer pilot-plant spray-drying tower. In this case, however, the solid phase of the detergent slurry used (water content 45%) had a surfactant content (anionic and nonionic surfactants) of approx. 16% by weight and a soda content (expressed as anhydrous soda) of approx. 24% by weight, the rest consisting of zeolite NaA, waterglass, acrylic acid copolymer (Sokalan ®), fatty acid soap in the form of the sodium salt and typical minor components.

The slurry introduced into the tower had a temperature of 70° C. The slurry was atomized under the same conditions as in Example 1. The tower entry temperature of the super-heated steam was 190° C. and the exit temperature of 120° C. for a steam flow rate of 160 kg/h. The spray-dried product may be characterized as follows—the data of a comparable product dried with hot air (entry temperture 160° C., exit temperature 75° C.) are again shown in brackets for comparison:

| | |
|---|---|
| Larger than 1.6 mm | 0.4 (2.2) |
| Larger than 0.8 mm | 8.6 (17.1) |
| Larger than 0.4 mm | 14.3 (26.7) |
| Larger than 0.2 mm | 20.0 (33.2) |
| Larger than 0.1 mm | 49.1 (17.9) |
| Larger than 0.01 mm | 7.6 (2.8) |

The dry product had an apparent density of 680 g/l (603 g/l) and a water content of 15.6% (11.5%), as determined by the same standard method as in Example 1.

Example 3

An aqueous fatty alcohol sulfate paste (Sulfopon T55, a product of Henkel KGaA), water content approx. 41% by weight, mixed with 5% by weight soda was atomized in the Niro-Atomizer pilot-plant spray-drying tower under the same conditions as in Example 1. A throughput of approx. 2.4 kg/h Sulfopon T55 was achieved for a water evaporation rate of approx. 1 kg/h. Drying was carried out in co-current with 140 kg/h superheated steam (entry temperature 250° C., exit temperature 130° C.). The product is characterized as follows—the corresponding data for drying with air (tower entry temperature 210° C., tower exit temperature 130° C.) are again shown in brackets for comparison:

| | |
|---|---|
| Larger than 1.6 mm | — (—) |
| Larger than 0.8 mm | — (0.5) |
| Larger than 0.4 mm | 40.8 (62.7) |
| Larger than 0.2 mm | 35.7 (31.7) |
| Larger than 0.1 mm | 22.5 (1.6) |
| Larger than 0.01 mm | 1.0 (—) |

The product has an apparent density of 350 g/l (210 g/l) and a water content—determined as in Example 1—of approx. 6% (1.5%).

Example 4

Several detergent or cleaning product slurries were atomized by a centrifugal disk atomizer (rotational speed 25,000 r.p.m.) in the Niro-Atomizer pilot-plant spray-drying tower. Drying was carried out in co-current in comparison tests conducted on the one hand with air and on the other hand with superheated steam.

The following products I to IV in the form of aqueous slurries are used.

Product I (laundry detergent formulation) containing in its solids component approx. 17% by weight of a mixture of anionic and nonionic surfactants, approx. 12.5% by weight soda (expressed as calcined soda), approx. 36% by weight sodium sulfate and, for the rest, zeolite NaA (main builder component), acrylic acid copolymer (co-builder), waterglass and minor components.

Product II cleaning product mixture (spotting salt) containing approx. 6% by weight anionic surfactant, approx. 20% by weight waterglass, approx. 25% by weight sodium sulfate and, for the rest, calcined soda and minor components.

Product III laundry detergent mixture containing approx. 15% by weight of a mixture of anionic and nonionic surfactants, approx. 12.5% by weight calcined soda, approx. 30% by weight sodium sulfate and, for the rest, builder and co-builder components, waterglass and minor components.

Product IV laundry detergent mixture containing in its solids component approx. 20% by weight anionic and nonionic surfactant compounds, approx. 40% by weight main builder and co-builder components, approx. 20% by weight calcined soda and, for the rest, waterglass and other minor components.

The working conditions and the products obtained for the comparative drying tests—on the one hand with air in conventional processes and, on the other hand, with steam in the process according to the invention—are shown in the following Table. The following general observations may be made:

The density of the steam-dried powder is generally higher than in corresponding drying with air. The difference in density is between 5.5 and 23%, depending on the slurry used. Between 25% and 50% of the energy supplied by the superheated steam were expended in evaporating the water present in the slurry. The dry matter content in % by weight is abbreviated to DM in the Table. The resulting residual moisture content of the powder—as determined with a Satorius MA 30 infrared dryer—is less than 10% by weight in every case.

TABLE

| Test No. | $T_{gas}$ in/out °C. | Quantity of slurry l/h | Quantity of steam m³/h | DM slurry % | DM powder % | Apparent density g/l |
|---|---|---|---|---|---|---|
| I/Air | 160/110 | 3.2 | | 58.0 | 96.7 | 294 |
| I/Steam | 175/125 | 3.2 | 170 | 58.0 | 92.4 | 310 |
| II/Air | 220/180 | 3.2 | | 68.0 | 98.8 | 622 |
| II/Steam | 220/150 | 3.2 | 190 | 68.0 | 97.6 | 685 |
| III/Air | 235/220 | 4.5 | | 56.0 | 97.6 | 247 |
| III/Steam | 235/150 | 4.5 | 195 | 56.0 | 94.4 | 323 |
| IV/Air | 253/210 | 4.5 | | 63.0 | 97.5 | 271 |
| IV/Steam | 257/170 | 4.5 | 200 | 63.0 | 93.3 | 287 |

Slurry density: approx. 1.5 kg/l

We claim:

1. The process of producing particulate, solid, pourable and free-flowing materials selected from the group consisting of wetting agents, detergents, detergent components, and mixtures thereof, said materials being prepared from water-containing compositions by spray-drying said compositions in a hot gas stream under normal pressure wherein said hot gas stream consists essentially of superheated steam, and terminating the spray-drying of said materials before they are completely dry or damaged by heat effects.

2. A process as in claim 1 wherein said water-containing compositions contain materials which are not damaged by exposure to water or steam at a temperature of 100° C. to 110° C. for at least 0.5 to 1 minute.

3. A process as in claim 1 wherein said materials are selected from the group consisting of a surfactant, emulsifier, builder, washing alkali, filler, neutral salt, fabric softener, bleach activator, soil suspending agent, and abrasive.

4. A process as in claim 1 wherein said spray-drying of said water-containing compositions is terminated at a residual water content of from about 1 to about 20% by weight, based on the weight of said particulate materials.

5. A process as in claim 1 including recovering individual components of said materials in the form of free-flowing dry materials or as mixtures thereof containing a water-soluble salt capable of binding water of crystallization.

6. A process as in claim 1 wherein said detergents comprise a mixture containing surfactants, builders, washing alkalis, and neutral salts.

7. A process as in claim 1 wherein said spray-drying is conducted with said superheated steam at a temperature of from about 100° C. to about 380° C.

8. A process as in claim 1 carried out with a closed-loop steam system using recycled steam wherein the amount of water evaporated from said water-containing compositions is removed from the recycled steam.

9. A process as in claim 1 wherein said superheated steam is conducted co-currently or counter-currently with respect to said water-containing compositions, a partial stream of steam is removed from the spray-drying step, and the partial stream of steam removed from the spray-drying step is re-used in the spray-drying process.

10. A process as in claim 9 wherein the steam removed from the spray-drying step is freed from entrained particles of dry materials and re-used in the spray-drying process.

11. A process as in claim 1 wherein said materials are anionic surfactants.

12. A process as in claim 1 wherein said materials are silicates.

13. A process as in claim 1 wherein said materials are laundry detergent compositions.

14. A process as in claim 1 further including (a) mixing the spray-dried materials with an auxiliary component which is capable of binding residual quantities of water from said materials, or (b) further drying the spray-dried materials under conditions that will not damage said materials, or (c) post-treating the spray-dried materials in a manner as to homogenize the residual moisture content in said materials.

15. A process as in claim 14 wherein in said step (a) said auxiliary component is a particulate solid and is present in an amount sufficient to assure the pourability and free-flow properties of said materials.

16. A process as in claim 14 including adding said auxiliary component of step (a) to said water-containing compositions before said spray-drying step.

17. A process as in claim 14 wherein in step (a) said auxiliary component is selected from the group consisting of a filler, a builder component, and a washing alkali.

18. A process as in claim 14 wherein said further drying step (b) is carried out in a fluidized bed apparatus.

19. A process as in claim 18 wherein said further drying step (b) carried out in said fluidized bed apparatus is conducted with superheated steam.

20. A process as in claim 14 wherein said post-treating step (c) is conducted with ambient air.

21. A process as in claim 18 wherein said further drying step (b) is conducted with steam at a temperature of at least 200° C.

* * * * *